Nov. 3, 1959 — W. R. METZKE — 2,911,266
SEAL STRUCTURE
Filed March 8, 1955
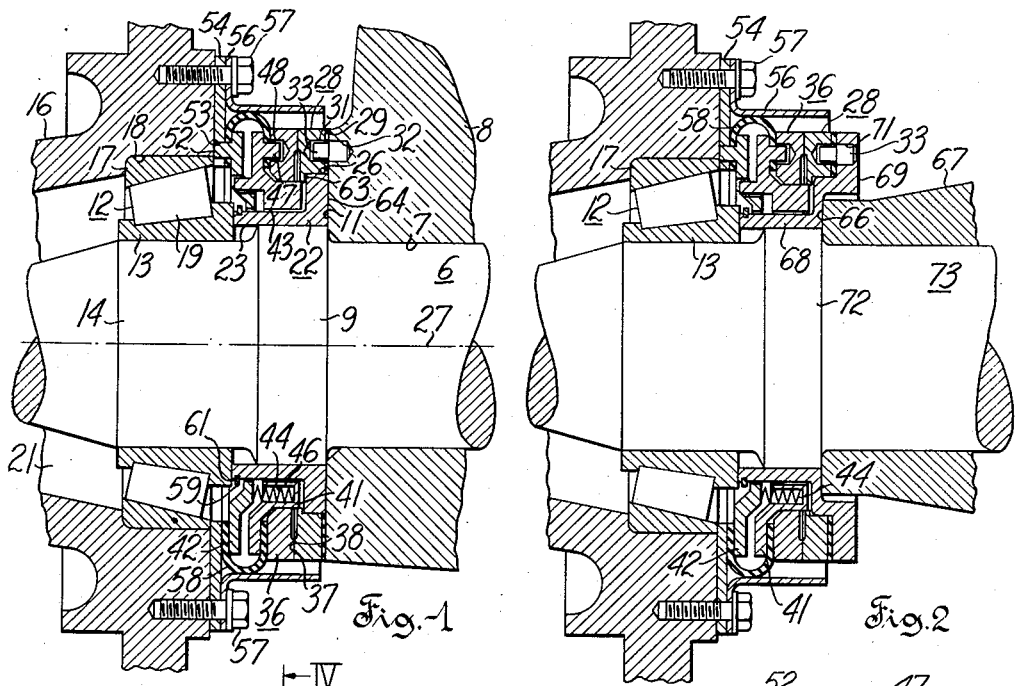
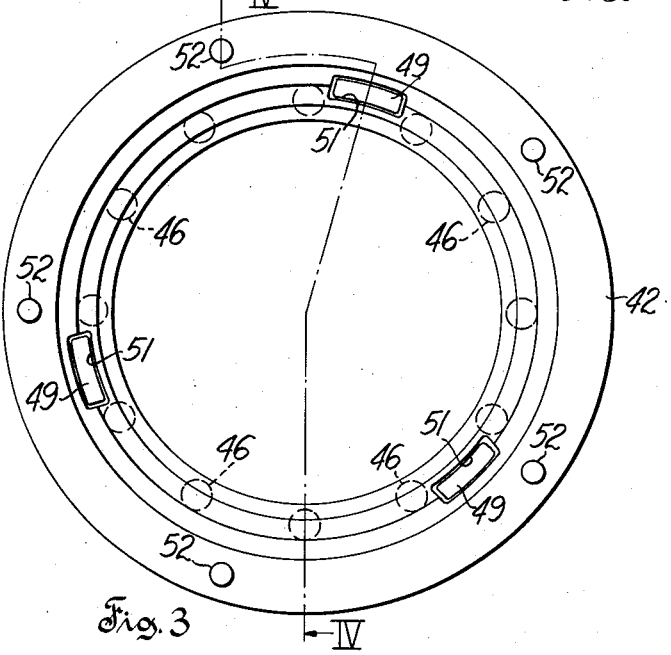
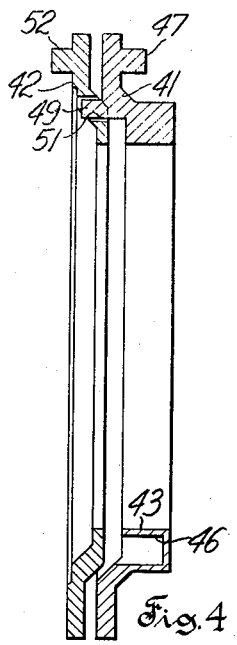
Inventor
William R. Metzke
by Charles L. Schwab
Attorney

United States Patent Office 2,911,266
Patented Nov. 3, 1959

2,911,266

SEAL STRUCTURE

William R. Metzke, Springfield, Ill., assignor to Allis-Chalmers Manufacturing Company, Milwaukee, Wis.

Application March 8, 1955, Serial No. 493,035

9 Claims. (Cl. 308—187.1)

This invention relates to seals for preventing escape of fluid from between relatively rotating parts and it is concerned more particularly with a face type or axial contact seal for installation in a limited axial space.

In certain bearing and seal installations, such as provided for a wheel mounted on a stub spindle, it is generally desirable to place the bearing on the spindle as close as possible to the vehicle frame member supporting the spindle, that is, the bearing should be spaced from the spindle supporting member a minimum axial distance. However, in those installations requiring an axial contact or face type seal a problem is presented in providing an effective seal of this type which will be fit in the desirably limited axial space between the wheel mounting bearing and the spindle supporting member. This problem is particularly acute where the axial contact seal must be of heavy components so as to operate satisfactorily in adverse conditions such as in mud, grit and water.

Not only is it desirable to provide an axial contact seal suitable for installation in a relatively limited axial space surrounding a wheel spindle, but it is also desirable that the seal parts be retained in assembly when the seal is not installed on a vehicle as, for instance, when the seal unit is in storage or shipment. Further, it is desirable to provide an axial contact seal which may readily be removed and installed as a unit and which has its sealing rings as nearly concentric with the axis of rotation of the wheel as possible.

It is a principal object of this invention to take care of the hereinbefore outlined requirements and difficulties in an entirely satisfactory manner.

More specifically, it is an object of this invention to provide an axial contact seal which takes up a minimum of axial space.

It is a further object of this invention to provide an improved axial contact seal of the hereinbefore outlined character which gives satisfactory service under adverse operating conditions and is easy to install and replace.

These and other objects and advantages of this invention will be evident when the following description is read in conjunction with the accompanying drawings, in which:

Fig. 1 is a section view of a wheel bearing and seal installation showing one embodiment of this invention;

Fig. 2 is a section view of a second embodiment of this invention;

Fig. 3 is an end view of parts of the seal shown in Figs. 1 and 2; and

Fig. 4 is a section taken on line IV—IV in Fig. 3.

Referring to Fig. 1, a wheel axle or spindle 6 is supported at one end by press fitted engagement with a bore 7 formed in a vehicle frame or spindle supporting member 8. Spindle 6 has an enlarged portion 9 which abuts a shoulder 11 presented by supporting member 8. A conventional taper bearing 12 has an inner raceway 13 push fitted on a cylindrical surface 14 of spindle 6 and this bearing 12 carries the major portion of the load imposed upon a wheel which it supports. Only a hub part 16 of this wheel is shown. The outer raceway 17 of taper bearing 12 is press fitted into an inward facing cylindrical surface 18 and tapered rollers 19 are operatively interposed between the inner and outer raceways. Another wheel supporting bearing, not shown, is interposed between the free outer end of a spindle 6 and the hub 16. A cap, not shown, seals the hollow hub 16 against axially outward escape of lubricant from its inner chamber 21.

The spindle 6 is in effect a cantilever beam and, therefore, it is desirable to place the bearing 12 as close as possible to the frame member 8 which supports the spindle 6 so that the load of the wheel is transferred to the spindle at a minimum distance from the supporting member 8.

Where operating conditions are such that wheels of a vehicle must operate in mud and frequently water, it has been found that axial contact seals are generally the most satisfactory type of seal for connecting the rotating wheel hub in fluid tight relation with the stationary wheel supporting member. However, an axial contact seal adapted for a heavy duty installation requires strong components of relatively large cross section. Accordingly, the problem presented is that of providing an axial contact seal that will fit in a preferably short axial space between the wheel hub 16 and supporting frame member 8 of a heavy duty vehicle.

Still referring to Fig. 1, a bearing spacer 22 is axially interposed between shoulder 11 of supporting member 8 and the inner raceway 13 of taper bearing 12 so as to position the bearing a predetermined axial distance from shoulder 11 of the spindle supporting member 8. The spacer 22 has a cylindrical sleeve portion 23 which is centered on and held against rotation relative to the spindle by being press fit upon enlarged portion 9 of spindle 6. Spacer 22 has a flange 64 extending radially outward from one end of the sleeve portion 23 in axially abutting relation to shoulder 11. Flange 64 of spacer 22 has a cylindrical surface 26 formed concentric with the axis 27 of spindle 6 which mounts an abutment ring 28. A fluid sealing washer 29 is positioned between abutment ring 28 and shoulder 11 to place the abutment ring in fluid tight engagement with the supporting member 8. A plurality of circumferentially spaced holes 31 are drilled in abutment ring 28 in axially registering relation with a plurality of holes 32 formed in supporting member 8. A plurality of pins 33 extend through appropriate holes in washer 29 into holes 31, 32 for preventing relative rotation between abutment ring 28 and supporting member 8.

The ends of pins 33 extending into holes 31 in abutment ring 28 are of smaller diameter than holes 31 and, accordingly, in no way interfer with the centering of abutment ring 28 on surface 26 of spacer 22.

A sealing ring 36 has a radially extending annulose sealing face 37 in axial contacting fluid sealing relation with a complementary annulose sealing surface 38 formed on abutment ring 28. Sealing face 37 and sealing surface 38 are precision smooth so that a fluid tight connection is provided between the relatively rotatable rings 36 and 28.

Referring to Figs. 1, 3 and 4, a pressure means for urging sealing ring 36 axially against abutment ring 28 includes a pair of axially spaced follower members 41 and 42 which are interlocked to prevent relative rotation therebetween. Follower member or ring 41 has a radial flange in axially confronting relation to the axial side of sealing ring 36 remote from abutment ring 28 and has a cylindrical flange 43 extending in radially inward telescoping relation to sealing ring 36 and abutment ring 28. A plurality of coil springs 44 are nested in a plurality of axially extending cavities or drilled holes 46 formed in cylindrical flange 43 of follower ring 41. The coil springs 44 which extend within the bore of sealing ring 36 urge follower ring 41 and follower or backing plate 42 in axially opposite directions. Follower ring 41 has a plurality of circumferentially spaced ears 47 which extend axially into registering holes 48 formed in sealing ring 36 to prevent rotation between the latter and the follower ring 41.

Referring particularly to Figs. 3 and 4, the follower ring has twelve axially drilled holes 46 for receiving twelve coil springs 44 as previously mentioned. Three generally rectangular shaped lugs 49 are presented by follower ring 41 and are circumferentially spaced 120 degrees apart. These lugs 49 extend into three generally rectangular shaped openings 51 in follower plate 42 so as to prevent relative rotation between ring 41 and plate 42, but at the same time permit axial shifting therebetween.

Referring to Figs. 1, 3 and 4, five axially extending and circumferentially spaced ears 52 are formed on follower plate 42. These ears 52 fit into complementary holes 53 formed in bearing retainer washer 54 which, together with a bearing shield 56, is secured to wheel hub 16 by a plurality of bolts 57 screwed into tapped holes in hub 16.

From the previous description and as shown in the drawings, the sealing ring 36 is positively rotated with the wheel hub 16 through the follower plate 42 having ears 52 extending into holes 53 of washer 54 and interlocking follower ring 41 having ears 47 extending into holes 48 in sealing ring 36. A flexible fluid tight boot 58 has a radially inward extending flange at one axial end interposed between sealing ring 36 and follower ring 41 and has another radially inward extending flange at its other axial end interposed between follower plate 42 and washer 54. Thus the sealing ring 36 is connected in fluid tight sealed relation with the wheel hub 16 with which it rotates.

The spacer 22 serves not only to space the bearing 12 relative to the supporting member shoulder 11 and to center the abutment ring 28, but also serves as a retainer by virtue of its flange 64 being in axially abutting relation with abutment ring 28 and by virtue of its having a releasable snap ring 59 which fits in a groove 61 formed in the sleeve portion 23. The snap ring 59 forms an abutment element constituting stop means for preventing axial withdrawal of the follower plate. The snap ring 59 is of conventional construction having a radial gap, not shown, allowing it to resiliently deform to desired radial size for installation and removal. In its installed condition the snap ring 59 is in axially abutting relation to the radially inner end of follower plate 42. A radial surface 63 is formed in axially abutting relation to flange 64 of spacer 22 so as to prevent withdrawal of abutment ring 28 over the flange 64. Thus when the wheel and bearing are removed from the spindle 6 the axial contact seal may be removed as a unit in package form. The spacer 22 serves as a retainer when the seal unit is stored or handled.

Referring to Fig. 2, a somewhat different embodiment of the invention is shown. The axial space between a shoulder 66 formed on a spindle supporting member 67 and the inner raceway 13 of bearing 12 is less than that available in the embodiment of the invention shown in Fig. 1. The supporting member 67 is cylindrical in shape at its outer end and this permits the spacer 68 to be formed somewhat differently than spacer 22 shown in Fig. 1.

Similar to the embodiment shown in Fig. 1, the abutment ring 28 is centered on spacer 68, however, the flange 69 extends in axially overlapping relation to the supporting member 67 and extends radially outward in axially confronting relation to the abutment ring 28. The pins 33 are positioned in holes 71 drilled in flange 69. Except for the spacer 68 the parts of the package seal shown in Fig. 2 are the same as those shown in Fig. 1.

Similar to the embodiment shown in Fig. 1, the spacer 68 is centered on an enlarged portion 72 presented by a spindle 73 and is held against rotation relative to the spindle 73 and its supporting member 67 by virtue of the spacer 68 being press fit on enlarged portion 72 of spindle 73.

From the foregoing description and drawings it is evident that an axial contact seal has been provided which may be installed in a relatively narrow axial space. The placing of the coil springs 44 radially between the retainer 22 and the sealing ring 36 permits a minimum of axial spacing between follower members 41 and 42.

Also the spacer 22 serves three primary functions, that is, it spaces the bearing 12 relative to a shoulder on the spindle supporting members, centers the abutment ring 28 and together with a snap ring it retains the seal in assembled or package form.

The seal provided consists generally of a pair of relatively rotatable sealing members in the form of a sealing ring and an abutment ring, a pressure means for urging the sealing ring axially toward the abutment ring and a retainer. The pressure means includes a follower ring with a cylindrical portion extending in radially inward telescoping relation to the sealing ring so as to be disposed within the bore of the latter. In order to permit the pressure means to take up a minimum of axial space, the resilient elements for exerting axial thrust are nested in pockets or cavities formed in the cylindrical part of the follower ring. The axial thrust transmitting elements, coil springs 44 in the drawings, each have one end extending within the bore of sealing ring 36 and each have their other end abutting a backing structure which is a follower plate 42 in the drawings.

Although only two embodiments of the invention are shown, it is not intended to limit the invention to these embodiments; but rather the invention may take such other forms as are embraced by the scope of the appended claims.

It is claimed and desired to secure by Letters Patent:

1. In an axial contact seal structure the combination comprising; a sealing ring having a plane annular sealing surface on one of its axially opposite sides and having a radially inward facing cylindrical surface defining a radially innermost bore extending axially through said sealing ring formed generally concentric with said sealing surface, a follower ring having a radially extending flange in axially confronting relation to the other of said axially opposite sides of said sealing ring and having a cylindrical sleeve extending within said innermost bore of said sealing ring in telescoping relation to the latter, a backing plate spaced axially from said follower ring at the side of the latter remote from said sealing ring, wall means in said sleeve defining a plurality of pockets extending in radially underlying relation to said sealing ring, each of said pockets having an opening in axially confronting relation to said backing plate, and a plurality of coil springs nested in said pockets and operatively interposed between said backing plate and said sleeve of said follower ring.

2. In a seal structure between a pair of relatively rotatable radially inner and outer members having a bearing operatively interposed between said outer member and a spindle portion of said inner member the combination comprising: a spacer element having a cylindrical sleeve part surrounding said spindle portion intermediate said bearing and a shoulder on said radially inner member and presenting a radially outward extending annular flange at its axial end adjacent said shoulder; an abutment ring centered on said annular flange; means for connecting said abutment ring with said inner member in nonrotatable relation thereto, said abutment ring having a radial sealing surface at one of its axial ends; an axially shiftable sealing ring in radially outward spaced relation to said spacer element and having a sealing face for complementary axial sealing engagement with said sealing surface on said abutment ring; means for connecting said axially shiftable sealing ring with said outer member so as to be nonrotatable relative thereto; and pressure means operatively interposed between said sealing ring and said outer member for urging said sealing ring axially toward said abutment ring including a resilient thrust transmitting element disposed in radially inward and underlying relation to said sealing ring.

3. In combination: a bearing; a bearing supported structure; a bearing supporting structure having a cylindrical portion mounting said bearing and having a radially extending shoulder axially spaced from said bearing; a spacer surrounding and nonrotatably associated with said cylindrical portion intermediate said shoulder and said bearing for spacing the latter relative to said shoulder, said spacer having a radially extending annular flange at its end adjacent said shoulder presenting an outward facing cylindrical surface concentric with said cylindrical portion of said bearing supporting structure; and abutment ring mounted on said cylindrical surface and nonrotatably connected with said bearing supporting structure; an annular sealing surface formed on said abutment ring in axially facing relation to said bearing; a sealing ring axially movable relative to said spacer and presenting an annular face for complementary sealing engagement with said annular sealing surface on said abutment ring; means connecting said axially movable sealing ring for rotation with said bearing supported structure; flexible sealing means for connecting said sealing ring and bearing supported structure in fluid tight relation to one another; and thrust transmitting means operatively interposed between said sealing ring and said bearing supported structure including a resilient element disposed radially between said spacer and said sealing ring in radially underlying relation to the latter for urging said sealing ring axially into sealing contact with said abutment ring.

4. In combination: a bearing; a bearing supported structure; a bearing supporting structure having a cylindrical portion mounting said bearing and having a radially extending shoulder axially spaced from said bearing; a spacer surrounding and nonrotatably associated with said cylindrical portion intermediate said shoulder and said bearing for spacing the latter relative to said shoulder, said spacer having a radially extending annular flange at its end adjacent said shoulder presenting an outward facing cylindrical surface concentric with said cylindrical portion of said bearing supporting structure; an abutment ring mounted on said cylindrical surface and nonrotatably connected with said bearing supporting structure; an annular sealing surface formed on said abutment ring in axially facing relation to said bearing; said abutment ring presenting a radial surface facing axially toward said shoulder and disposed in thrust transmitting relation to said annular flange for limiting axial movement of said abutment ring relative to said annular flange; a sealing ring axially movable relative to said spacer and presenting an annular face for complementary sealing engagement with said annular sealing surface on said abutment ring; means connecting said axially movable sealing ring for rotation with said bearing supported structure; flexible sealing means for connecting said sealing ring and bearing supported structure in fluid tight relation to one another; thrust transmitting means operatively interposed between said sealing ring and said bearing supported structure including a resilient element disposed in radially underlying relation to said sealing ring and between the latter and said spacer for urging said sealing ring axially into sealing contact with said abutment ring; and stop means releasably connected with said spacer for limiting axial movement of said thrust transmitting means in the axial direction away from said sealing ring.

5. In combination: a bearing; a bearing supported structure; a bearing supporting structure having a cylindrical portion mounting said bearing and having a radially extending shoulder axially spaced from said bearing; a spacer surrounding and nonrotatably associated with said cylindrical portion intermediate said shoulder and said bearing for spacing the latter relative to said shoulder, said spacer having a radially extending annular flange at its end adjacent said shoulder presenting an outward facing cylindrical surface concentric with said cylindrical portion of said bearing supporting structure; an abutment ring mounted on said cylindrical surface and nonrotatably connected with said bearing supporting structure; an annular sealing surface formed on said abutment ring in axially facing relation to said bearing; a sealing ring axially movable relative to said spacer and presenting an annular face for complementary sealing engagement with said annular sealing surface on said abutment ring; means connecting said axially movable sealing ring for rotation with said bearing supported structure; flexible sealing means for connecting said sealing ring and bearing supported structure in fluid tight relation to one another; and thrust transmitting means for urging said sealing ring axially into sealing contact with said abutment ring.

6. In combination: a bearing; a bearing supported structure; a bearing supporting structure having a cylindrical portion mounting said bearing and having a radially extending shoulder axially spaced from said bearing; a spacer surrounding and nonrotatably associated with said cylindrical portion intermediate said shoulder and said bearing for spacing the latter relative to said shoulder, said spacer having a radially extending annular flange at its end adjacent said shoulder presenting an outward facing cylindrical surface concentric with said cylindrical portion of said bearing supporting structure; an abutment ring mounted on said cylindrical surface and nonrotatably connected with said bearing supporting structure; an annular sealing surface formed on said abutment ring in axially facing relation to said bearing; said abutment ring presenting a radial surface facing axially toward said shoulder and disposed in thrust transmitting relation to said annular flange for limiting axial movement of said abutment ring relative to said annular flange; a sealing ring axially movable relative to said spacer and presenting an annular face for complementary sealing engagement with said annular sealing surface on said abutment ring; means connecting said axially movable sealing ring for rotation with said bearing supported structure; flexible sealing means for connecting said sealing ring and bearing supported structure in fluid tight relation to one another; thrust transmitting means for urging said sealing ring axially into sealing contact with said abutment ring; and stop means releasably connected with said spacer for limiting axial movement of said trust transmitting means in the axial direction away from said sealing ring.

7. In an axial contact sealing unit of the type having a pair of relatively rotatable sealing rings the combination comprising: an axially extending cylindrical retainer in radially inner relation to and nonrotatably carrying one of said sealing rings, an annular flange portion at one end of said retainer being associated in thrust transmitting relationship with said one ring so as to limit movement of the latter in one axial direction; pressure means in axial thrust transmitting relation with the other of said sealing rings including a resilient axial thrust transmitting element disposed radially between said retainer and the other of said sealing rings for urging the latter toward said one sealing ring in said one axial direction; and stop means releasably secured to the other end of said retainer and engageable with said pressure means for limiting movement of the latter in the axial direction opposite to said one axial direction.

8. In an axial contact seal unit of the type having a pair of relatively rotatable sealing rings the combination comprising: an axially extending cylindrical retainer having a flange portion at one end presenting an annular cylindrical bearing surface; an inner cylindrical surface formed on one of said sealing rings being complementary to and nonrotatably mounted on said annular cylindrical bearing surface of said flange portion, said flange being associated in axial thrust transmitting relationship with said one ring so as to limit movement of the latter in one axial direction; pressure means associated in thrust transmitting relationship with the other of said sealing rings and including a resilient axial thrust transmitting element disposed radially between said retainer and said other sealing ring for urging the latter toward said one sealing ring in said one axial direction; stop means releasably secured to the other end of said retainer and engageable with said pressure means for limiting movement of the latter in the axial direction opposite to said one axial direction.

9. In a cartridge type seal structure adaptable for installation between a first and second relatively rotatable radially spaced members having a bearing structure operatively interposed therebetween wherein said first member presents a shoulder portion, said cartridge type seal structure comprising: an axially extending collar to be nonrotatably carried on said one relatively rotatable member, said collar having opposite ends for abutting said bearing structure and said shoulder portion; a radially extending flange presented on one end of said collar; first and second relatively rotatable axial contact sealing ring elements, said first sealing ring element having a radial surface in axial thrust transmitting relation to said flange so as to limit movement of said first sealing ring in an axial direction away from said second sealing ring element; pressure means in thrust transmitting relationship with said second sealing ring element for urging the latter into sealing contact with said first sealing ring element, said pressure means including a backing plate to be nonrotatably secured to said second relatively rotatable member and including a plurality of resilient axial thrust transmitting elements abutting said backing plate and disposed radially between said collar and said second sealing ring element; and stop means releasably connected with the other axial end of said collar and engageable by said backing plate for limiting movement of the latter in the axial direction away from said second sealing ring element.

References Cited in the file of this patent

UNITED STATES PATENTS

| | | |
|---|---|---|
| 1,972,393 | Radford | Sept. 4, 1934 |
| 2,615,739 | Vedovell | Oct. 28, 1952 |
| 2,639,170 | Schick et al. | May 19, 1953 |
| 2,701,154 | Dolhun | Feb. 1, 1955 |
| 2,797,939 | Laser | July 2, 1957 |

OTHER REFERENCES

| | | |
|---|---|---|
| 18,881 | Netherlands | Oct. 15, 1928 |